United States Patent [19]

Romer

[11] Patent Number: 4,863,075
[45] Date of Patent: Sep. 5, 1989

[54] BEACH CADDY

[75] Inventor: Robert Romer, Winchester, Mass.

[73] Assignee: Winchester Software Services, Inc., Winchester, Mass.

[21] Appl. No.: 120,333

[22] Filed: Nov. 12, 1987

[51] Int. Cl.[4] ............................................. A01C 15/04
[52] U.S. Cl. .................................. 222/610; 222/192; 222/401; 280/8; 108/19
[58] Field of Search ............... 222/609, 610, 628, 192, 222/401, 556, 529, 325; 280/47.34, 43.24, 47.13 B, 8, 10, DIG. 6, 7.12, 11; 239/146, 172; 108/26, 50, 56.1, 56.3, 44, 18, 19

[56] References Cited

U.S. PATENT DOCUMENTS

| 2,508,627 | 5/1950 | Spiegel et al. | 108/19 |
| 2,926,021 | 2/1960 | Altadonna | 280/11 |
| 2,926,923 | 3/1960 | Browne | 280/8 |
| 3,084,947 | 4/1963 | Booth | 280/11 |
| 3,851,891 | 12/1974 | Liu | 280/11 |
| 3,900,202 | 8/1975 | Doble | 280/8 |
| 3,927,894 | 12/1975 | Zawislak | 280/8 |
| 4,191,391 | 3/1980 | Doriini | 280/9 |
| 4,291,891 | 9/1981 | Blanchette | 280/9 |
| 4,455,948 | 6/1984 | Torres | 108/44 |
| 4,550,930 | 11/1985 | Proffit | 280/DIG. 6 X |
| 4,609,192 | 9/1986 | Bratcher | 108/19 X |
| 4,631,877 | 12/1986 | Molodecki | 280/8 X |

FOREIGN PATENT DOCUMENTS 694875 9/1964 Canada ................................ 222/628

Primary Examiner—Kevin P. Shaver
Assistant Examiner—Gregory L. Huson
Attorney, Agent, or Firm—Hamilton, Brook, Smith & Reynolds

[57] ABSTRACT

A beach caddy used for transporting and storing items for recreational use at the beach. The caddy is provided with runners for drawing across sandy surfaces and detachable wheels for rolling over paved surfaces. A refillable water tank within the caddy dispenses fluids for washing, drinking or any other use. An adjustable support is provided for retaining a beach umbrella and permitting it to be tilted in any desired direction. Detachable tables mounted on the sides of the caddy can be set up to support items transported by the caddy.

8 Claims, 2 Drawing Sheets

BEACH CADDY

BACKGROUND OF THE INVENTION

The present invention relates to devices used for carrying items for recreational use at the beach, and particularly involves a portable assembly with detachable wheels that can be drawn across both paved and sandy surfaces.

Recreational activities in warm climates often include outings to a beach. Typically, various items or supplies must be brought from the car or house to a location on the beach for use. This may often require several trips across a paved surface and a sandy portion of the beach when transporting these items by hand. Thus, a device that can be easily drawn across both paved and sandy surfaces, and that could transport supplies used at the beach would greatly ease this effort.

One such device is disclosed in U.S. Pat. No. 2,926,021, in which a metal or wooden container is mounted on runners to form a sled. Wheels mounted on the runners may be swung and locked into two positions such that the sled can be supported by the wheels, or alternatively, supported by said runners.

Such carryall vehicles requiring assembly are typically heavy, bulky items that wear quickly when exposed to the sand and moisture encountered at the beach. These devices are often awkward to assemble when being readied for use.

SUMMARY OF THE INVENTION

The present invention comprises a portable and practical device for transporting and storing items for recreational use at the beach.

A molded plastic basket is supported on a pair of runners so that the basket can be manually drawn across the sand with a cord and handle. The upper portion of the longer side walls of the basket have molded hand grips making it easy to lift.

Wheels mounted on axles are held by retaining clasps positioned along an outer surface of the basket that grasp the axle rods. The axled wheels can be removed and inserted into holders disposed within the runners which grasp and retain the two axles in a parallel configuration. The basket can then be rolled along a paved or other surface not suitable for runners.

The interior of the basket can be fitted with a refillable tank used for containing a fluid such as water. The water can be used for washing or drinking, etc. A preferred embodiment of the invention dispenses the fluid with a nozzle and a manually actuated pump. In one embodiment, the tank can be removed from the basket for easy cleaning and refilling. Handles are provided on an upper portion of the tank to ease removal.

A further aspect of the invention provides for the retention and support of a beach umbrella. A portion of the bottom of the basket is fitted with a disk bearing a number of molded support elements. A ring for the umbrella pole relative to these support elements is positioned along an upper portion of a wall of the basket. Each molded support will hold the bottom of the umbrella pole such that the pole is tilted at a different angle for each support when extending through the ring. The tank can be molded into a shape such that one of the tank walls is formed into a partial funnel. The top edge of the funnel forms a mating surface with the retaining ring, and the bottom edge is configured about a portion of the disk on which the support elements are located.

A preferred embodiment of the invention incorporates two detachable tables that can be mounted on opposite exterior sides of the basket for transport and storage. Each table has legs that can be orthogonally fitted to the underside of the table surface to support that surface.

The above, and other features of the invention, including various novel details of construction and combination of parts, will now be more particularly described with reference to the accompanying drawings and pointed out in the claims. It will be understood that the particular beach caddy embodying the invention is shown by way of illustration only and not as a limitation of the invention. The principal features of this invention may be employed in various embodiments without departing from the scope of the invention.

DETAILED DESCRIPTION OF THE INVENTION

Figure 1:
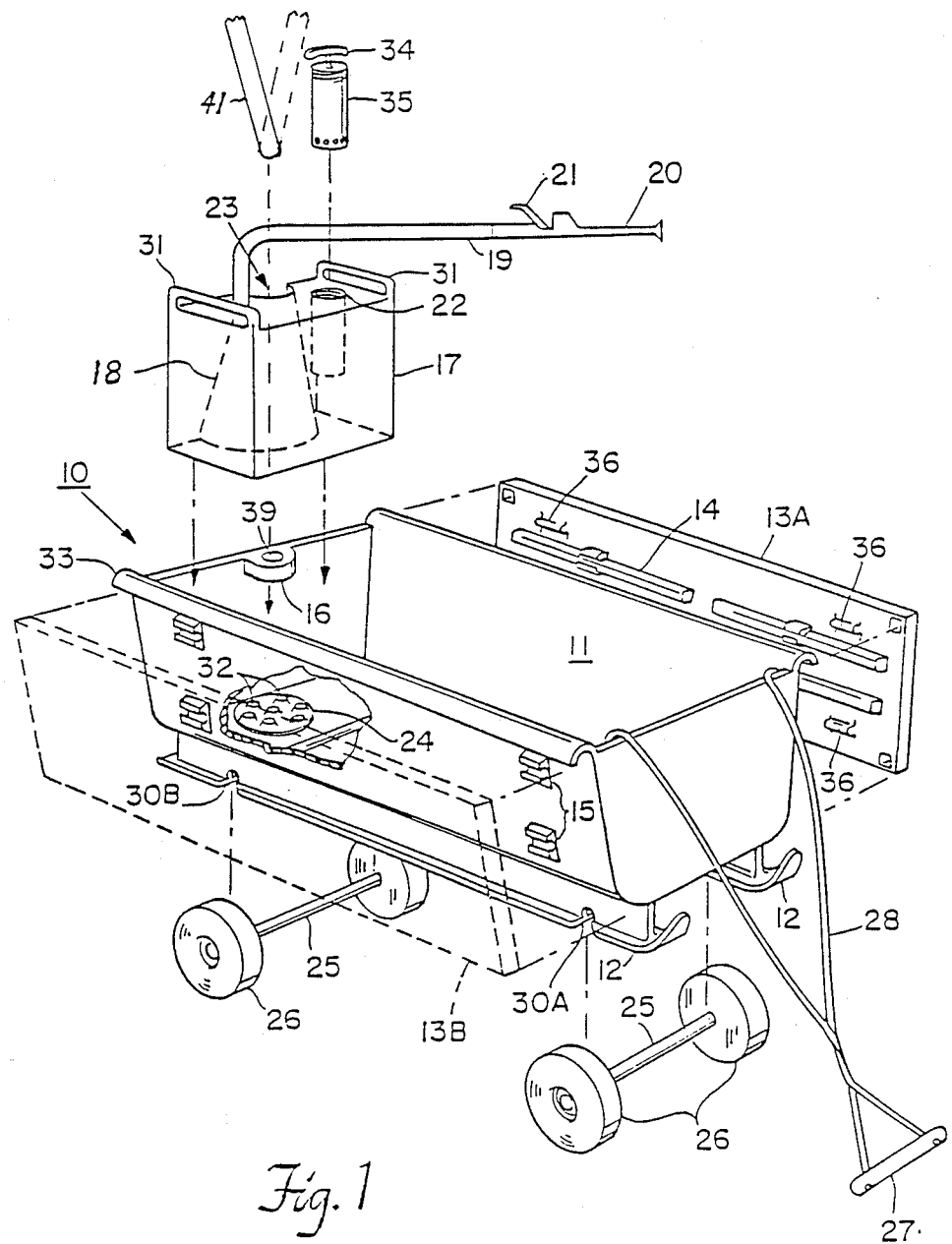
FIG. 1 shows a perspective and partial cut-a-way view of a preferred embodiment of the invention.

A preferred embodiment of the beach caddy is illustrated in the perspective view of FIG. 1. The caddy utilizes few mechanical parts that are subject to wear. A unitary molded plastic basket 11 is shown with parallel runners 12 or skis extending along the underside of the floor of the basket 11. Each of the runners 12 has a pair of mounting slots 30A and 30B such that an axle 25, with rotatable wheels 26 mounted at both ends, can be inserted into each slot. These detachable axled wheels permit the caddy to be supported by either the runners on soft surfaces like sand, or by the wheels on hard, flat surfaces, such as pavement.

A preferred embodiment utilizes a handle 27 attached to the basket 11 by a flexible cord 28 for pulling the caddy 10 along soft or hard surfaces. The caddy is provided with hand grips 33 extending along its longer sides to permit easy lifting of the entire unit and its contents. The basket 11 has sloping sides so that a number of baskets can be easily stacked inside one another for storage.

A refillable tank 17 for carrying fluids is located at one end of caddy 10 within the basket 11. A hand actuated pump 35 can be inserted into the tank 17 through port 22. The pump 35 and port 22 are threaded so that the tank can be pressurized by pumping the handle 34. A hose 19 can be attached to the tank 17 for dispensing the fluid within for drinking, washing, etc. A nozzle 20 with hand actuated valve 21 can be attached to the hose 19 to facilitate use of the fluid. The positive pressure generated by hand pump 35 provides the force to expell the fluid from the tank through nozzle 20. Removal of pump 35 permits the tank 17 to be refilled or cleaned as desired through port 22. A preferred embodiment permits the tank 17 to be removed from basket 11 with handles 31.

Figure 4:
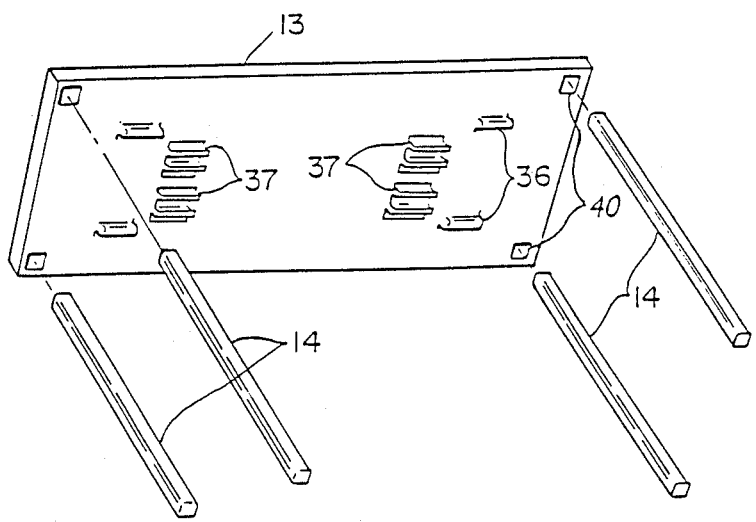
FIG. 4 is a perspective view illustrating a table of the embodiment of FIG. 1 with the support legs detached.

Portable tables 13A and 13B can be attached to the sides of the basket with clasps 15 mounted on the basket that grasp ridges 36 on the underside of each table surface. These tables 13A and 13B can be used to support items contained within the basket during transport. FIG. 4 illustrates how the legs 14 may be removed from clasps 37 located on the underside of the table and inserted in the receiving slots 40.

Additionally, the caddy 10 can be used to support a beach umbrella 41, first by means of a ring 16 with hole 39 through which the pole of the umbrella is inserted, and secondly a plurality of support elements 32 on disk 24 on which the bottom of the pole may be seated. The ring 16 can be removeable in one embodiment to permit easy stacking of baskets inside one-another. Each support element 32 engages an indentation in the bottom of the umbrella pole 41 so that the umbrella can be tilted in a number of positions, where each position corresponds to one element 32.

A preferred embodiment of the invention provides for a partial funnel 18 to be formed in the tank 17 during fabrication. The narrow upper lip 23 of this semi-conical wall 18 mates with the ring 16 that supports the upper portion of the pole. The funnel wall confines the lower portion of the umbrella pole so that the umbrella is not easily blown over even when lifted off its molded support 32. This design also isolates the pale from the items stored in the basket.

Figure 2:
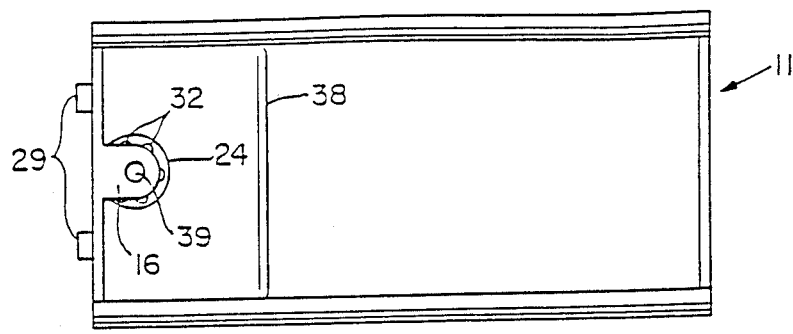
FIG. 2 is a plan view of the embodiment in FIG. 1 with the tank removed.

FIG. 2 depicts a top view of the caddy 11 with the tank temporarily removed. A retaining bar 38 is molded into the bottom of the basket to hold the tank along the rear of the caddy adjacent to the umbrella mount system 16 and 24. The disk 24 can either be removable or molded into the floor of the basket 11. The disk 24 is centered underneath hole 39 so that an umbrella pole inserted therethrough can be seated onto any of the support elements 32. The basket is provided with clasps 29 or other means for mounting the axled wheels when not being used to transport the caddy 10.

Figure 3:
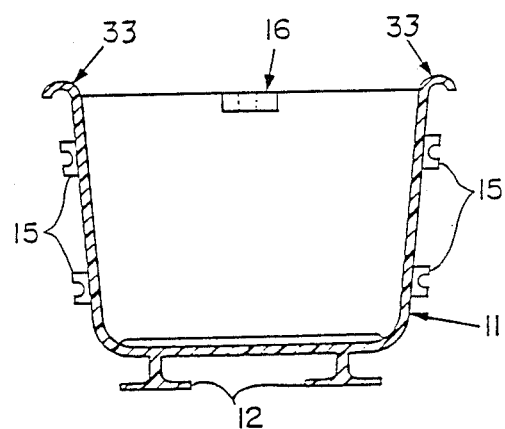
FIG. 3 is a cross-section of the basket of the embodiment of FIG. 1.

FIG. 3 is a cross-sectional view of the basket 11 that more clearly shows the relationship of the hand grips 33, the slanting sides of the basket 11, the clasps 15 on which the two side tables are mounted and the runners 12.

I claim:

1. A beach caddy comprising:
   a basket for carrying articles;
   a support member to support the basket;
   a tank attached to the basket to contain and dispense a fluid such that a wall of said tank in combination with an interior surface of the basket comprises an enclosed pole retaining envelope;
   a retention ring defining an aperture in the envelope for receiving a pole that extends into the envelope; and
   a plurality of nodules positioned on a floor of the basket within the pole retaining envelope such that an end of the pole can be seated on each nodule where the pole can be tilted in a plurality of positions in which the ring retains the pole at each position in conjunction with one nodule.

2. The beach caddy of claim 1 wherein said tank is refillable and detachable from the basket.

3. The beach caddy of claim 1 wherein said nodules support the pole of a beach umbrella.

4. The beach caddy of claim 1 further comprising dispensing means for pumping the fluid from the tank.

5. The beach caddy of claim 1 further comprising a detachable table mountable on an outer surface of the basket, and legs for supporting said table that are stored along an underside of the table when mounted on the basket.

6. The beach caddy of claim 1 further comprising pulling means for pulling the caddy.

7. The beach caddy of claim 1 wherein said support member comprises:
   a pair of runners with upwardly curved ends mounted on a bottom of said basket;
   a pair of axles with wheels secured to each end of each axle;
   a pair of axle mounts disposed towards a front and rear of each runner in which each axle is mountable; and
   a wheel retainer to retain said axled wheels on the basket when the caddy is supported by said runners.

8. The beach caddy of claim 7 wherein said axled wheels are mounted into said axle mounts such that said caddy can be rolled across surfaces on the wheels.

* * * * *